3,183,219
2-BENZOYL-5-METHOXYPHENYL ACRYLATE AND POLYMERS THEREOF
Norman W. Schuler, Lexington, Mass., assignor to Polaroid Corporation, Cambridge, Mass., a corporation of Delaware
No Drawing. Filed Oct. 29, 1963, Ser. No. 319,693
3 Claims. (Cl. 260—86.1)

This invention relates to novel polymers, and the process of making the same, and more particularly to novel polymers that absorb ultraviolet light.

One object of this invention is to provide novel ultraviolet light-absorbing addition polymers.

Another object of this invention is to provide a novel process for protecting color photographic images by means of novel ultraviolet light-absorbing polymers.

Still another object is to provide a novel color photographic image-receiving element which has been protected from injurious ultraviolet light by means of an ultraviolet light-absorbing polymer.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

It has been found desirable to protect materials sensitive to ultraviolet light, e.g., photographic color images, with a protective material which will absorb the harmful ultraviolet radiation but which will transmit radiation of other wavelengths. By applying such an ultraviolet-absorbing layer in the form of a polymer, several advantages may be gained, e.g., the application of the layer will be easier, the desired degree of ultraviolet absorption can be readily controlled by the thickness of the polymer or by the concentration of ultraviolet-absorbing groups in the polymer, the ultraviolet absorber will not migrate on the surface but will provide a stable continuous coating, a glossy coating may be imparted to the image-receiving element, and a protective coat to prevent physical damage may also be applied concurrently.

The novel ultraviolet-absorbing polymers of this invention are addition polymers containing ultraviolet-absorbing groups.

The addition-type ultraviolet-absorbing polymers of this invention may be prepared by reacting an ultraviolet light absorber containing a reactive phenolic group such as a phenolic benzophenone type ultraviolet light absorber, with an acid chloride containing a polymerizable double bond, e.g., acrylyl chloride, and polymerizing the thus-formed monomer. Polymerization may be carried out with the resulting monomer alone, i.e., a homopolymer may be formed, or with another monomer to provide a copolymer possessing particular characteristics.

The following nonlimiting examples illustrate the preparation of addition-type ultraviolet-absorbing polymers within the scope of this invention.

*Example A*

2-benzoyl-5-methoxyphenyl acrylate was prepared in the following manner: To a solution of 2.3 gm. of 2-hydroxy-4-methoxy benzophenone in 10 ml. of 5% aqueous sodium hydroxide under nitrogen was added 1.8 gm. of acrylyl chloride at 0° C. The reaction was stirred 45 min. and then filtered. The solid was dissolved in ether, washed twice with water and dried over magnesium sulfate. The yellow oil layer left after evaporation of the ether was distilled. The monomer, an almost white solid, crystallized and showed a melting point of 35° C.

*Example 1*

20 ml. of ethyl alcohol containing 9 gm. of 2-vinyl pyridine, 1 gm. of 2-benzoyl-5-methoxyphenyl acrylate (prepared by the method of Example A) and 0.03 gm. azobisisobutyronitrile was sealed under vacuum and heated at 65° C. for 65 hrs. The resulting copolymer of 2-vinylpyridine with 2-benzoyl-5-methoxy-phenyl acrylate

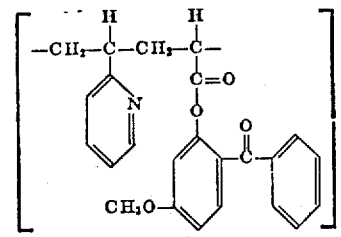

was isolated by precipitation into hexane and purified by four precipitations from acetone into ether and dried.

*Example 2*

A polymer was prepared as in Example 1 using 3 gm. of 2-vinylpyridine and 1 gm. of 2-benzoyl-5-methoxyphenyl acrylate (prepared by the method of Example A).

*Example 3*

20 ml. of ethanol containing 9 gm. of acrylamide and 1 gm. of 2-benzoyl-5-methoxyphenyl acrylate (prepared by the method of Example A) was exposed to ultraviolet light for 3 hrs. The resulting copolymer of acrylamide with 2-benzoyl-5-methoxyphenyl acrylate was precipitated and washed with ethanol and water and isolated.

Other phenolic benzophenone ultraviolet absorbers and acid chlorides containing a polymerizable double bond and useful in preparing addition polymers in accordance with this invention will readily suggest themselves to one skilled in the art.

The novel addition-type ultraviolet-absorbing polymers of this invention may also be prepared by reacting a phenolic containing benzophenone-type ultraviolet light absorber with an acrylic ester, e.g., ethyl acrylate, and polymerizing the resulting product.

The copending application of Howard G. Rogers, Serial No. 786,766, filed January 14, 1959, now abandoned, discloses means for protecting color photographic images from the deleterious effects of sunlight. The invention is primarily concerned with color diffusion transfer processes wherein a photosensitive element including a silver halide emulsion layer is exposed to create therein a latent image. The latent image is developed and, concurrent with and under the control of this development, an imagewise distribution of mobile organic color-providing substances is formed. At least a portion of these color-providing substances is transferred to a superposed image-receiving stratum to form a colored image thereon. As examples of such processes, mention may be made of the processes disclosed and claimed in U.S. Patent No. 2,983,606, issued May 9, 1961, to Howard G. Rogers, U.S. Patent No. 2,647,049, issued July 28, 1953, to Edwin H. Land, U.S. Patent No. 2,774,668, issued December 18, 1956, to Howard G. Rogers. In one mode of carrying out the invention of the above-designated copending application, Serial No. 786,766, an ultraviolet light absorber may be incorporated in a layer over the dyeable structure of an image-receiving element and, during processing, a substantial portion of the transferred color-providing substances may be caused to permeate through such layers to the underlying dyeable stratum so as to be protected from the deleterious effects of sunlight by the overlying layer through which they had permeated.

The novel ultraviolet light-absorbing polymers of this invention are suitable for use in the invention of the copending application, Serial No. 786,766. Novel image-receiving elements may be prepared by applying a polymer within the scope of this invention to an image-receiving element. The thickness of the polymer layer may be varied to suit particular needs; however, a thin polymer layer is preferably applied, in order to minimize any loss of density or difficulties in transferring the color-providing substances through the polymer. The amount of ultraviolet light-absorbing polymer utilized necessarily depends upon the stability and susceptibility of the color-providing substances carried by the image-receiving layer to the harmful rays of sunlight.

Image-receiving elements suitable for use within the scope of this invention generally comprise a support which has been coated with an image-receiving stratum of dyeable material, e.g., polyvinylpyridine, a mixture of polyvinylpyridine and gelatin or polyvinyl alcohol, a mixture of polyvinyl alcohol and polyvinyl pyrrolidone, copolymers of vinyl alcohol and vinyl pyrrolidone, and nylons such as N-methoxymethyl polyhexamethylene adipamide. The preferred image-receiving elements comprise polyvinylpyridine, such as those disclosed and claimed in the copending application of Howard C. Haas, Serial No. 50,848, filed August 22, 1960.

The effectiveness of the image-receiving elements of this invention was tested by exposing such elements, containing dye developer transfer images formed in accordance with the procedures described in said U.S. Patent No. 2,983,606, to a bank of sun lamps along with a control comprising an image-receiving element similar in composition to the one on test, but without the protective polymeric layer. After exposure of 72 hours, the transfer images, prepared by using the image-receiving elements of this invention exhibited substantially less fading than the control images.

The novel polymers of this invention are useful as barrier layers to provide protection against the harmful effects of ultraviolet radiation. The novel polymers of this invention may be used to provide a layer of a non-migratory ultraviolet absorber on color photographic images as disclosed above or may be incorporated into waxes, polishes, paints and lacquers to provide protection for furniture against harmful effects of sunlight.

Since certain changes may be made in the above product and process without departing from the scope of the invention herein involved, it is intended that all matter contained in the above description shall be interpreted as illustrative and not in a limiting sense.

What is claimed is:
1. 2-benzoyl-5-methoxyphenyl acrylate.
2. A copolymer of acrylamide with 2-benzoyl-5-methoxyphenol acrylate.
3. A copolymer of 2-vinylpyridine with 2-benzoyl-5-methoxyphenyl acrylate.

References Cited by the Examiner
UNITED STATES PATENTS 3,068,193 12/62 Havens et al. _____ 260—486
3,120,564 2/64 Milionis et al. _____ 260—86.1

JOSEPH L. SCHOFER, *Primary Examiner.*

DONALD E. CZAJA, *Examiner.*

UNITED STATES PATENT OFFICE
CERTIFICATE OF CORRECTION

Patent No. 3,183,219                                 May 11, 1965

Norman W. Schuler

It is hereby certified that error appears in the above numbered patent requiring correction and that the said Letters Patent should read as corrected below.

Column 2, line 24, for "precipitations" read -- reprecipitations --; column 4, line 24, for "methoxyphenol" read -- methoxyphenyl --.

Signed and sealed this 25th day of July 1967.

(SEAL)
Attest:

Edward M. Fletcher, Jr.

Attesting Officer

EDWARD J. BRENNER
Commissioner of Patents